US009594837B2

(12) United States Patent
Raman et al.

(10) Patent No.: US 9,594,837 B2
(45) Date of Patent: Mar. 14, 2017

(54) PREDICTION AND INFORMATION RETRIEVAL FOR INTRINSICALLY DIVERSE SESSIONS

(71) Applicant: Microsoft Corporation, Redmond, WA (US)

(72) Inventors: Karthik Raman, Ithaca, NY (US); Paul Nathan Bennett, Kirkland, WA (US); Kevyn Breca Collins-Thompson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 13/776,717

(22) Filed: Feb. 26, 2013

(65) Prior Publication Data

US 2014/0244610 A1    Aug. 28, 2014

(51) Int. Cl.
*G06F 17/30* (2006.01)
(52) U.S. Cl.
CPC .............. *G06F 17/30864* (2013.01)
(58) Field of Classification Search
CPC ................................ G06F 17/30864
USPC ....................................... 707/706
See application file for complete search history.

(56) References Cited

U.S. PATENT DOCUMENTS

| 7,779,009 | B2 | 8/2010 | Chowdhury et al. |
| 7,818,315 | B2 | 10/2010 | Cucerzan et al. |
| 7,984,004 | B2 | 7/2011 | Andrew et al. |
| 2007/0208730 | A1 | 9/2007 | Agichtein et al. |
| 2007/0294225 | A1* | 12/2007 | Radlinski et al. ............... 707/3 |
| 2008/0104045 | A1 | 5/2008 | Cohen et al. |
| 2011/0161311 | A1 | 6/2011 | Mishne et al. |
| 2011/0208730 | A1 | 8/2011 | Jiang et al. |
| 2011/0258148 | A1* | 10/2011 | Gao et al. ........................ 706/12 |
| 2011/0295776 | A1 | 12/2011 | Donato et al. |
| 2012/0011112 | A1 | 1/2012 | Bian et al. |
| 2012/0143789 | A1* | 6/2012 | Wang et al. .................... 706/12 |

(Continued)

OTHER PUBLICATIONS

Yang Song et al, "Post-Ranking Query Suggestion by Diversifying Search Results", Jul. 24-28, 2011, ACM, pp. 815-824.*

(Continued)

*Primary Examiner* — Etienne Leroux
*Assistant Examiner* — Jared Bibbee
(74) *Attorney, Agent, or Firm* — Alin Corie; Sandy Swain; Micky Minhas

(57) ABSTRACT

Various technologies described herein pertain to predicting intrinsically diverse sessions and retrieving information for such intrinsically diverse sessions. Search results retrieved by a search engine responsive to executing a query are received. A query classifier can be employed to determine whether the query is intrinsically diverse or not intrinsically diverse based on one or more features of the query and session interaction properties. The query is intrinsically diverse when included in an intrinsically diverse session directed towards a task, where the query and disparate queries included in the intrinsically diverse session are directed towards respective subtasks of the task. An objective function can be evaluated based at least upon the query to compute an optimized value when the query is determined to be intrinsically diverse. The search results can be presented on a display screen according to the optimized value when the query is determined to be intrinsically diverse.

20 Claims, 9 Drawing Sheets

(56) References Cited

U.S. PATENT DOCUMENTS

2012/0158685 A1    6/2012  White et al.
2014/0164346 A1*   6/2014  Bottum et al. ............... 707/706

OTHER PUBLICATIONS

Chomicki, "Querying with Intrinsic Preferences", 2002, Springer-Verlag, pp. 1-18.*
Abhimanyu Lad, "A Framework for Evaluation and Optimization of Relevance and Novelty-based Retrieval", 2011, pp. 1-132.*
Radlinski et al., "Improving Personalized Web Search using Result Diversification", Aug. 6, 2006, pp. 1-2.*
Bruno M. Fonseca et al, "Using association rules to discover search engines related queries", 2003, IEEE, pp. 1-6.*
Shaozhi Ye et al, "A Query-Dependent Duplicate Detection Approach for Large Scale Search Engines", 2004, pp. 48-58.*
"International Search Report & Written Opinion for PCT Patent Application No. PCT/US2014/017522", Mailed Date: May 27, 2014, Filed Date: Feb. 20, 2014, 13 Pages.
He, et al., "Web Query Recommendation via Sequential Query Prediction", In IEEE 25th International Conference on Data Engineering, Mar. 29, 2009, pp. 1443-1454.
Zhu, et al., "A Unified Framework for Recommending Diverse and Relevant Queries", Retrieved at <<http://www.ra.ethz.ch/CDStore/www2011/proceedings/p37.pdf>>, In the proceedings of 20th International Conference on World Wide Web, Mar. 28, 2011, pp. 37-46.
Agrawal, et al., "Diversifying Search Results", Retrieved at <<http://www.dblab.ece.ntua.gr/~gtsat/diversity/p5-agrawal%20%5BDiversifying%20Search%20Results%5D.pdf>>, In Proceedings of the Second ACM International Conference on Web Search and Data Mining, Feb. 9, 2009, pp. 5-14.
Bailey, et al., "Evaluating Whole-Page Relevance", Retrieved at <<http://vju-fiit-diplomovka.googlecode.com/svn/branches/s02_final/materialy/dp_20110413/p767-bailey.pdf>>, In Proceedings of the 33rd International ACM SIGIR Conference on Research and Development in Information Retrieval, Jul. 19, 2010, pp. 767-768.
Bennett, et al., "Modeling the Impact of Short- and-Long-Term Behaviour on Search Personalization", Retrieved at <<http://research.microsoft.com/en-us/um/people/ryenw/papers/BennettSIGIR2012.pdf>>, In Proceedings of the 35th International ACM SIGIR Conference on Research and Development in Information Retrieval, Aug. 12, 2012, pp. 1-10.
Brandt, et al., "Dynamic Ranked Retrieval", Retrieved at <<http://www.cs.cornell.edu/people/tj/publications/brandt_etal_11a.pdf>>, In Proceedings of the Fourth ACM International Conference on Web Search and Data Mining, Feb. 9, 2011, pp. 247-256.
Broccolo, et al., "Generating Suggestions for Queries in the Long Tail with an Inverted Index", Retrieved at <<http://pomino.isti.cnr.it/~silvestr/wp-content/uploads/2011/02/papertpdf>>, In Information Processing and Management, vol. 48, Issue 2, Mar. 2012, pp. 1-17.
Cao, et al., "Context-Aware Query Suggestion by Mining Click-Through and Session Data", Retrieved at <<http://rp-www.it.usyd.edu.au/~josiah/lemma/cao_et_al_kdd_2008.pdf>>, In Proceedings of the 14th ACM SIGKDD International Conference on Knowledge Discovery and Data Mining, Aug. 24, 2008, pp. 1-9.
Carbonell, et al., "The Use of MMR, Diversity-Based Reranking for Reordering Documents and Producing Summaries", Retrieved at <<http://www.cs.cmu.edu/~jgc/publication/The_Use_MMR_Diversity_Based_LTMIR_1998.pdf>>, In Proceedings of the 21st Annual International ACM SIGIR Conference on Research and Development in Information Retrieval, Aug. 24, 1998, pp. 335-336.
Chen, et al., "Less is More: Probabilistic Models for Retrieving Fewer Relevant Documents", Retrieved at <<http://citeseerx.ist.psu.edu/viewdoc/download?doi=10.1.1.125.2701&rep=rep1&type=pdf>>, In Proceedings of the 29th Annual International ACM SIGIR Conference on Research and Development in Information Retrieval, Aug. 6, 2006, pp. 429-436.

Dang, et al., "Learning to Rank Query Reformulations", Retrieved at <<http://ciir.cs.umass.edu/~bemike/pubs/2010-3.pdf>>, In Proceedings of the 33rd International ACM SIGIR Conference on Research and Development in Information Retrieval, Jul. 19, 2010, pp. 807-808.
Bona, et al., "Learning Dense Models of Query Similarity from User Click Logs", Retrieved at <<http://www.aclweb.org/anthology-new/N/N10/N10-1071.pdf>>, In Human Language Technologies, Jun. 2010, pp. 474-482.
Fujita, et al., "Learning to Rank Query Recommendations by Semantic Similarities", Retrieved at <<http://arxiv.org/pdf/1204.2712.pdf>>, In proceedings of The Computing Research Repository, Apr. 2012, pp. 1-8.
Gollapudi, et al., "Efficient Query Rewrite for Structured Web Queries", Retrieved at <<http://research.microsoft.com/pubs/151928/backoff-CIKM2011.pdf>>, In Proceedings of the 20th ACM international Conference on Information and Knowledge Management, Oct. 24, 2011, pp. 2417-2420.
Hagen, et al., "Webis at the TREC 2010 Sessions Track", Retrieved at <<http://trec.nist.gov/pubs/trec19/papers/bauhaus.univ.Session.rev.pdf>>, In Proceedings of the Nineteenth Text Retrieval Conference, Nov. 16, 2010, pp. 1-10.
Hagen, et al., "Webis at the TREC 2011 Sessions Track", Retrieved at <<http://trec.nist.gov/pubs/trec20/papers/Webis.session.update.pdf>>, In Proceedings of the Twentieth Text Retrieval Conference, Nov. 15, 2011, pp. 1-5.
Hassan, et al., "A Task Level Metric for Measuring Web Search Satisfaction and its Application on Improving Relevance Estimation", Retrieved at <<http://research.microsoft.com/pubs/151927/cikm1146-hassan.pdf>>, In Proceedings of the 20th ACM International Conference on Information and Knowledge Management, Oct. 24, 2011, pp. 125-134.
He, et al., "CWI at TREC 2011: Session, Web, and Medical", Retrieved at <<http://trec.nist.gov/pubs/trec20/papers/CWI.session.web.medical.pdf>>, In Proceedings of the Twentieth Text Retrieval Conference, Nov. 15, 2011, pp. 1-8.
Jarvelin, et al., "Discounted Cumulated Gain based Evaluation of Multiple-Query IR Sessions", Retrieved at <<http://www.sis.uta.fi/infim/julkaisut/fire/2008/SessionDCG-ECIR-08.pdf>>, In Proceedings of the IR Research, 30th European Conference on Advances in Information Retrieval, Apr. 2008, pp. 4-15.
Joachims, et al., "Evaluating the Accuracy of Implicit Feedback from Clicks and Query Reformulations in Web Search", Retrieved at <<http://sing.stanford.edu/cs303-sp11/papers/joachims_etal_07a.pdf>>, In Journal of ACM Transactions on Information Systems, vol. 25, Issue 2, Apr. 2007, pp. 1-26.
Kanoulas, et al., "Evaluating Multi-Query Sessions", Retrieved at <<http://ir.cis.udel.edu/~carteret/papers/sigir11b.pdf>>, In Proceeding of the 34th International ACM SIGIR Conference on Research and Development in Information Retrieval, Jul. 24, 2011, pp. 1053-1062.
Kanoulas, et al., "Overview of the TREC 2010 Session Track", Retrieved at <<http://trec.nist.gov/pubs/trec19/papers/Session.Overview.2010.pdf>>, In Proceedings of the Nineteenth Text Retrieved Conference, Nov. 16, 2010, pp. 1-27.
Kanoulas, et al., "Overview of the TREC 2011 Session Track", Retrieved at <<http://trec.nist.gov/pubs/trec20/papers/Session.Overview.2011.pdf>>, In Proceedings of the Twentieth Text Retrieval Conference, Nov. 15, 2011, pp. 1-29.
Kotov, et al., "Modeling and Analysis of Cross-Session Search Tasks", Retrieved at <<http://research.microsoft.com/en-us/um/people/sdumais/sigir2011-multisession-fp566-kotov.pdf>>, In Proceedings of the 34th International ACM SIGIR Conference on Research and Development in Information Retrieval, Jul. 24, 2011, pp. 5-14.
Liao, et al., "Evaluating the Effectiveness of Search Task Trails", Retrieved at <<http://research.microsoft.com/pubs/158169/www2012_task_metric.pdf>>, In Proceedings of the 21st International Conference on World Wide Web, Apr. 16, 2012, pp. 1-10.
Liu, et al., "Rutgers at the TREC 2011 Session Track", Retrieved at <<http://trec.nist.gov/pubs/trec20/papers/SCI_TREC_2011.session.pdf>>, In Proceedings of the Twentieth Text Retrieval Conference, Nov. 15, 2011, pp. 1-9.

(56) References Cited

OTHER PUBLICATIONS

Ma, et al., "Diversifying Query Suggestion Results", Retrieved at <<http://www.cse.cuhk.edu.hk/~king/PUB/AAAI2010-Ma.pdf>>, In Proceedings of the Twenty-Fourth AAAI Conference on Artificial Intelligence, Jul. 11, 2010, pp. 1-6.
Pound, et al., "Facet Discovery for Structured Web Search: A Query-log Mining Approach", Retrieved at <<http://www.cs.uoi.gr/~tsap/publications/sigmod352-pound.pdf>>, In Proceedings of the ACM SIGMOD International Conference on Management of Data, Jun. 12, 2011, pp. 1-13.
Radlinski, et al., "Redundancy, Diversity and Interdependent Document Relevance", Retrieved at <<http://research.microsoft.com/pubs/122719/2009d_sigirforum_radlinski.pdf>>, In Newsletter of ACM SIGIR Forum, vol. 43, Issue 2, Dec. 2009, pp. 1-7.
Radlinski, et al., "Query Chains: Learning to Rank from Implicit Feedback", Retrieved at <<http://www.cs.cornell.edu/people/tj/publications/radlinski_joachims_05a.pdf>>, In Proceedings of the Eleventh ACM SIGKDD International Conference on Knowledge Discovery in Data Mining, Aug. 21, 2005, pp. 1-10.
Raman, et al., "Structured Learning of Two-Level Dynamic Rankings", Retrieved at <<http://www.cs.cornell.edu/people/tj/publications/raman_etal_11a.pdf>>, In Proceedings of the 20th ACM International Conference on Information and Knowledge Management, Oct. 24, 2011, pp. 1-6.
Sadikov, et al., "Clustering Query Refinements by User Intent", Retrieved at <<http://homes.cs.washington.edu/~alon/www2010.pdf>>, In Proceedings of the 19th International Conference on World Wide Web, Apr. 26, 2010, pp. 1-10.
Santos, et al., "Exploiting Query Reformulations for Web Search Result Diversification", Retrieved at <<http://terrierteam.dcs.gla.ac.uk/publications/santos10www.pdf>>, In Proceedings of the 19th International Conference on World Wide Web, Apr. 26, 2010, pp. 1-10.
Santos, et al., "Selectively Diversifying Web Search Results", Retrieved at <<http://citeseerx.ist.psu.edu/viewdoc/download-?doi=10.1.1.175.4850&rep=rep1&type=pdf>>, In Proceedings of the 19th ACM International Conference on Information and Knowledge Management, Oct. 26, 2010, pp. 1-10.
Singla, et al., "Studying Trailfinding Algorithms for Enhanced Web Search", Retrieved at <<http://research.microsoft.com/pubs/167888/Final_Trailfinding_SIGIR10.pdf>>, In Proceedings of the 33rd International ACM SIGIR Conference on Research and Development in Information Retrieval, Jul. 19, 2010, pp. 1-8.
Slivkins, et al., "Learning Optimally Diverse Rankings over Large Document Collections", Retrieved at <<http://research.microsoft.com/pubs/122693/optimallydiverserankings.pdf>>, In Proceedings of the 27th International Conference on Machine Learning, Jun. 21, 2010, pp. 1-8.
Song, et al., "Optimal Rare Query Suggestion with Implicit User Feedback", Retrieved at <<http://research.microsoft.com/pubs/118641/wfp0763-song.pdf>>, In Proceedings of the 19th International Conference on World Wide Web, Apr. 26, 2010, pp. 1-10.
Song, et al., "Post-Ranking Query Suggestion by Diversifying Search Results", Retrieved at <<http://research.microsoft.com/pubs/147464/sigirfp546-song.pdf>>, In Proceedings of the 34th International ACM SIGIR Conference on Research and Development in Information Retrieval, Jul. 24, 2011, pp. 1-10.

Song, et al., "Query Suggestion by Constructing Term-Transition Graphs", Retrieved at <<http://research.microsoft.com/pubs/157631/wsdm111-song.pdf>>, In Proceedings of the Fifth ACM International Conference on Web Search and Data Mining, Feb. 8, 2012, pp. 1-10.
Sontag, et al., "Probabilistic Models for Personalizing Web Search", Retrieved at <<http://cs.nyu.edu/~dsontag/papers/sontag_wsdm12.pdf>>, In Proceedings of the Fifth ACM International Conference on Web Search and Data Mining, Feb. 8, 2012, pp. 1-10.
Swaminathan, et al., "Essential Pages", Retrieved at <<http://ieeexplore.ieee.org/stamp/stamp.jsp?tp=&arnumber=5286076>>, In Proceedings of the IEEE/WIC/ACM International Joint Conference on Web Intelligence and Intelligent Agent Technology, Sep. 15, 2009, pp. 1-10.
Hassan, et al., "Task Tours: Helping Users Tackle Complex Search Tasks", Retrieved at <<http://research.microsoft.com/en-us/um/people/ryenw/papers/HassanCIKM2012.pdf>>, In Proceeding of 21st ACM International Conference on Information and Knowledge Management, Oct. 29, 2012, pp. 1-5.
White, et al., "Predicting Short-Term Interests Using Activity-Based Search Context", Retrieved at <<http://research.microsoft.com/en-us/um/people/sdumais/cikm1248-white.pdf>>, In Proceedings of the 19th ACM International Conference on Information and Knowledge Management, Oct. 26, 2010, pp. 1-10.
Yuan, et al., "Building the Trail Best Traveled: Effects of Domain Knowledge on Web Search Trailblazing", Retrieved at <<http://research.microsoft.com/en-us/um/people/ryenw/papers/YuanCHI2012.pdf>>, In Proceedings of the SIGCHI Conference on Human Factors in Computing Systems, May 5, 2012, pp. 1-10.
Yue, et al., "Predicting Diverse Subsets Using Structural SVMs", Retrieved at <<http://www.cs.cornell.edu/people/tj/publications/yue_joachims_08a.pdf>>, In Proceedings of the 25th International Conference on Machine Learning, Jun. 5, 2008, pp. 1-8.
Zhang, et al., "Interactive Retrieval Based on Faceted Feedback", Retrieved at <<http://184pc128.csie.ntnu.edu.tw/presentation/10-09-14/Interactive%20Retrieval%20Based%20on%20Faceted%20Feedback.pdf>>, In Proceedings of the 33rd International ACM SIGIR Conference on Research and Development in Information Retrieval, Jul. 19, 2010, pp. 1-8.
Zhao, et al., "Time-Dependent Semantic Similarity Measure of Queries using Historical Click-Through Data", Retrieved at <<http://www2006.org/programme/files/pdf/598.pdf>>, In Proceedings of the 15th International Conference on World Wide Web, May 23, 2006, pp. 1-10.
Dupret, et al, "Using Related Queries to Improve Web Search Results Ranking", Retrieved at <<http://link.springer.com/chapter/10.1007%2F978-3-642-16321-0_22?LI=true>>, In SPIRE, 2010, pp. 213-224.
Guo et al., "Intent-Aware Query Similarity", Retrieved at <<http://dl.acm.org/citation.cfm?id=2063619>>, In ACM Conference on Information and Knowledge Management (CIKM), CIKM '11, 2011, pp. 259-268.
"Response to International Search Report (ISR) and Written Opinion for PCT Patent Application No. PCT/US2014/017522", Filed Date: Sep. 17, 2014, 12 Pages.
"Written Opinion for PCT Patent Application No. PCT/US2014/017522", Mailed Date: Jan. 20, 2015, 8 pages.
"Response to Written Opinion for PCT Patent Application No. PCT/US2014/017522", Filed Date: Mar. 4, 2015, 5 pages.

\* cited by examiner

PREDICTION AND INFORMATION RETRIEVAL FOR INTRINSICALLY DIVERSE SESSIONS

BACKGROUND

Research on diversified retrieval of information has commonly focused on diversifying search results due to ambiguity in user intent, which is referred to as extrinsic diversity. Conventional search engines oftentimes provide support for extrinsic diversity in search results. Accordingly, the search engine can attempt to cover potentially diverse information retrieval intents of many users for a given query. For instance, the query "Cardinals" may trigger an extrinsically diverse algorithm that attempts to return search results concerning "Cardinals baseball," "Cardinals football," "Catholic Cardinals," and the like. By supporting extrinsic diversity, conventional search engines attempt to supply search results related to information retrieval intents of different users for a common query.

Further, conventional research on web search has focused on optimizing and evaluating single query sessions. However, many user queries can be part of more complex tasks that span multiple queries across one or more search sessions. Thus, conventional approaches oftentimes lead to users issuing multiple queries to obtain documents on different aspects of a question or topic on which they desire to find more information or explore.

SUMMARY

Described herein are various technologies that pertain to predicting intrinsically diverse sessions and retrieving information for such intrinsically diverse sessions. Search results retrieved by a search engine responsive to executing a query can be received. A query classifier can be employed to determine whether the query is intrinsically diverse or not intrinsically diverse based on one or more features of the query and properties of a session interaction so far. The query is intrinsically diverse when included in an intrinsically diverse session directed towards a task, where the query and disparate queries included in the intrinsically diverse session are directed towards respective subtasks of the task. Moreover, an objective function can be evaluated based at least upon the query to compute an optimized value when the query is determined to be intrinsically diverse. Further, the search results can be presented on a display screen according to the optimized value when the query is determined to be intrinsically diverse. The optimized value is an approximation of an optimal solution; accordingly, presentation of the search results on the display screen can be enhanced by being based on the optimized value.

Intrinsic diversity is diversity across different aspects of a single user's intent (e.g., aspect-driven sessions). Conventional approaches commonly involve a user issuing multiple queries to find different aspects of such an intrinsically diverse information retrieval intent. In contrast, various aspects described herein support decreasing a number of queries associated with finding such information.

In accordance with various embodiments, an occurrence of an intrinsically diverse session can be identified. For instance, a query classifier can be learned to identify intrinsically diverse sessions, and such query classifier can be employed to detect occurrence of intrinsically diverse sessions. Moreover, in accordance with various embodiments, search result presentation for intrinsically diverse queries can be optimized. Search result presentation can be optimized, for instance, by re-ranking search results, selecting supplemental user interface elements (e.g., selected related queries), positioning the supplemental user interface elements within a user interface relative to the search results, a combination thereof, and so forth. Further, in accordance with various embodiments, intrinsically diverse sessions can be extracted (e.g., from a search log) to populate an intrinsically diverse session database.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
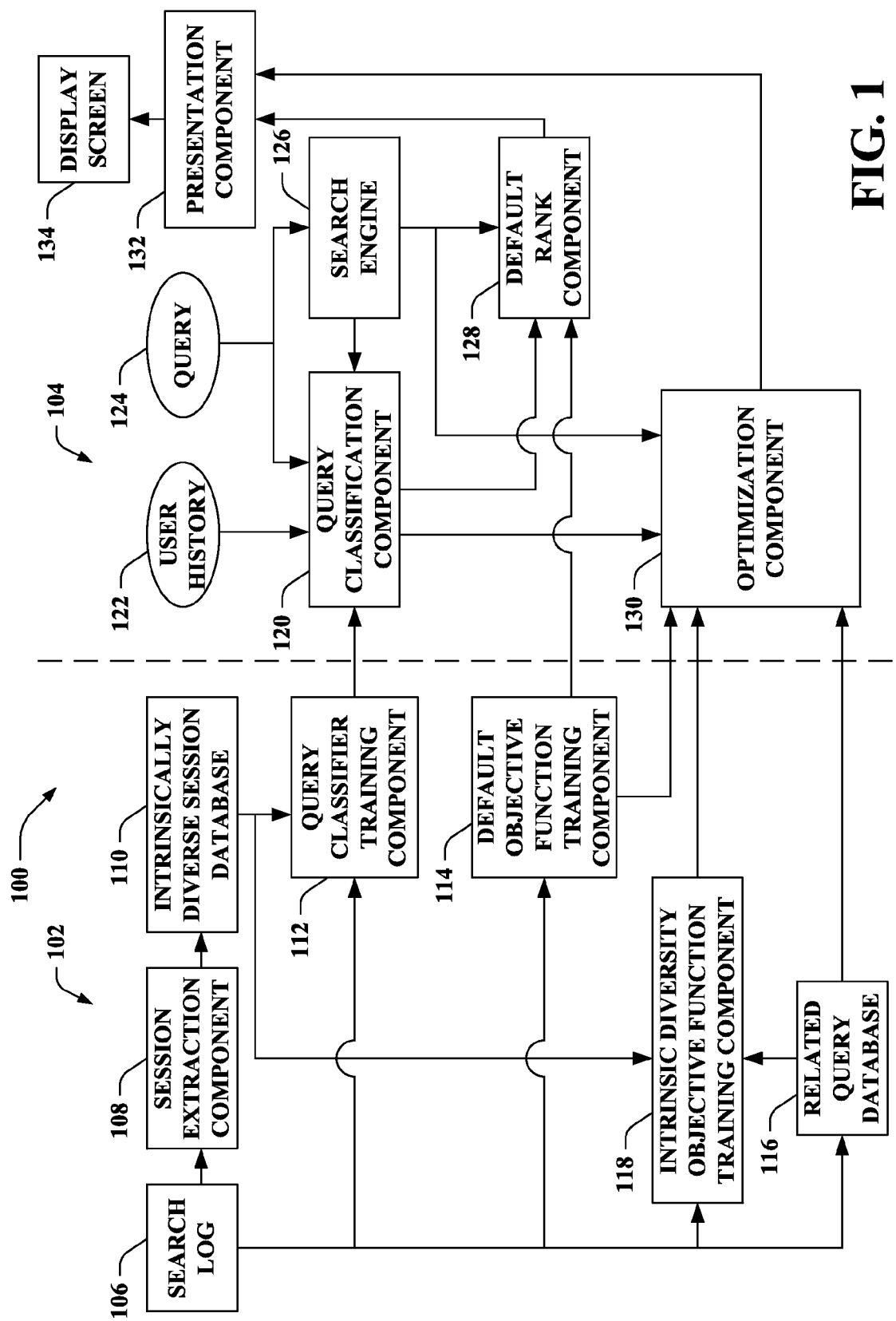
FIG. 1 illustrates a functional block diagram of an exemplary system that predicts intrinsically diverse sessions and retrieves information for such intrinsically diverse sessions.

Various technologies pertaining to predicting intrinsically diverse sessions and retrieving information for such intrinsically diverse sessions are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that predicts intrinsically diverse sessions and retrieves information for such intrinsically diverse sessions. The system 100 supports individual users with complex information retrieval intents that lead to finding diverse information centered on a common task, theme, topic, or question. The foregoing can be referred to as intrinsically diverse information retrieval intents.

Conventional search engines provide little or no support for an intrinsically diverse information retrieval intent of a user. Accordingly, a user typically issues multiple queries to find information pertaining to different aspects of her intrinsically diverse information retrieval intent. In contrast, the system 100 enables the user to obtain information pertaining to different aspects of her intrinsically diverse information retrieval intent while issuing fewer queries as compared to conventional techniques, thereby allowing for faster retrieval of such information. Additionally or alternatively, the system 100 can provide search results that may be more relevant to the intrinsically diverse information retrieval intent towards a top of a list of search results.

A query can be intrinsically diverse when included in an intrinsically diverse session directed towards a task. The query and disparate queries included in the intrinsically diverse session are directed towards respective subtasks of the task. Thus, the queries in the intrinsically diverse session, while individually directed towards the respective subtasks, are being performed in the context of the task. The intrinsically diverse session covers a broad topic, where information in various facets of the topic is provided as opposed to giving targeted depth in one facet. In contrast, some conventional approaches may provide information in one facet, while other conventional approaches attempt to cover different information retrieval intents of different users when unsure of the intent of a given user (e.g., the extrinsic diversity scenario).

A first query in an intrinsically diverse session is referred to herein as an initiator query. Moreover, remaining queries (other than an initiator query) in an intrinsically diverse session are referred to herein as successor queries.

Intrinsically diverse sessions can be exploratory, comprehensive, survey-like, or comparative in nature. Such sessions may result from users seeking different opinions on a topic, exploring or discovering aspects of a topic, or trying to ascertain an overview of a topic. While a single, comprehensive result on the topic may satisfy an information retrieval intent of a user when available, several or many results may be used to provide the user with adequate information. Examples of two types of intrinsically diverse sessions include sessions where queries are directed towards aspects of a common topic (referred to herein as multi-faceted search sessions) and sessions that include query sequences where results viewed influence subsequent queries in the query sequences (referred to herein as general exploratory search sessions). Accordingly, a query and disparate queries included in an intrinsically diverse session can each explore various aspects of a task, topic, or the like for general exploration or multi-faceted searching.

For instance, a multi-faceted search session may be employed by a user to research multiple aspects of a topic. As an example, a session with queries directed towards different subtopics about snow leopards can represent retrieval intent for intrinsically diverse information on a particular topic for that user. Examples of queries that can be issued as part of such intrinsically diverse session can include "snow leopards," "where do snow leopards live," "snow leopards lifespan," "snow leopard population," and "snow leopards in captivity." In general, queries included in the multi-faceted search session can be directed towards different subtasks (e.g., different questions, etc.).

Moreover, in a general exploratory search session, a user may be curious about a topic and may desire to obtain information about such topic, where one subtopic leads the user to another subtopic. As an illustration of a general exploratory search session, a user can read about a particular movie, which can cause the user to read about actors in the movie, which can cause the user to read about the setting of the movie, history behind movie, and so forth. Accordingly, in a general exploratory search session, one subtopic leads to the user exploring other subtopic(s).

It is noted that a user may conventionally discover aspects to explore in an intrinsically diverse session through the interaction process itself. Alternatively, the system 100 can provide a framework that is shaped by a user's information retrieval intent, and is configured to discover and associate relevant aspects for a topic automatically in a data-driven fashion. For example, for a user who issued the query "snow leopards," the system 100 can return relevant information that the user may have found themselves while engaged in a session on such topic, but automatically, given the initiator query. Thus, an amount of time and effort expended by the user can be reduced, which in turn can enhance their ability to further explore the topic.

Intrinsic diversity is diversity across different aspects of a single user's intent (e.g., aspect-driven sessions). Conventional approaches commonly involve users issuing multiple queries to find different aspects of such information retrieval intents. In contrast, the system 100 can support decreasing a number of queries associated with finding such information.

More particularly, the system 100 can support identifying when intrinsically diverse sessions occur. For instance, the system 100 can train a query classifier to identify intrinsically diverse sessions and employ the query classifier to detect occurrence of intrinsically diverse sessions. Further, the system 100 can optimize search result presentation for intrinsically diverse queries. Moreover, the system 100 can extract intrinsically diverse sessions (e.g., from a search log).

The system 100 can include a first subsystem 102 and a second subsystem 104. It is contemplated that the subsystem 102 can be an offline subsystem and the subsystem 104 can be an online subsystem. The subsystem 102 can populate an intrinsically diverse session database 110, learn a query classifier, learn parameters for a model to optimize a default objective function, and learn parameters for a model to optimize an intrinsic diversity objective function. Further, the subsystem 104 can employ the query classifier to classify a query 124, utilize the default objective function to present search results when the query is determined to be not intrinsically diverse, and utilize the intrinsic diversity objective function to present search results when the query is determined to be intrinsically diverse. According to other examples, it is contemplated that the system 100 need not include separate subsystems (e.g., the subsystem 102 and the subsystem 104 can be combined), both the subsystem 102 and the subsystem 104 can be online subsystems, and so forth.

The system 100 includes a search log 106 that can include queries input to a search engine. The search log 106 can also include search results retrieved by the search engine responsive to the queries. Further, the search log 106 can include satisfied click data, where a satisfied click refers to a selection of (e.g., click on) a search result that leads to the user dwelling on a document for at least a threshold period of time (e.g., 30 seconds, etc.) or terminating the search session. Moreover, a session can be considered to have no more than a 30 minute gap between adjacent queries; however, it is contemplated that other durations of time between adjacent queries can be utilized for determining a session. The search log 106, for instance, can be retained in a data repository (not shown).

Moreover, the system 100 includes a session extraction component 108 that can identify intrinsically diverse sessions from the search log 106 by filtering the queries in the search log 106 to extract intrinsically diverse sessions from the search log 106. The session extraction component 108 can retain the intrinsically diverse sessions extracted from the search log 106 in an intrinsically diverse session database 110. For instance, the intrinsically diverse session database 110 can be retained in a data repository (not shown). Accordingly, the session extraction component 108 can populate the intrinsically diverse session database 110 with examples of intrinsically diverse sessions from the search log 106. The examples of the intrinsically diverse sessions, as well as examples of non-intrinsically diverse sessions, can thereafter be utilized to learn a query classifier, models optimized for objective functions, and the like as described in greater detail below.

The system 100 further includes a query classifier training component 112 that trains a query classifier based upon features of the intrinsically diverse sessions from the intrinsically diverse session database 110. Thus, the intrinsically diverse sessions included in the intrinsically diverse session database 110 can be utilized to model features of intrinsically diverse sessions. Positive examples of intrinsically diverse sessions can be obtained by the query classifier training component 112 from the intrinsically diverse session database 110. Moreover, negative examples (e.g., non-intrinsically diverse sessions) can be obtained by the query classifier training component 112 from the search log 106. It is further contemplated that the positive examples and/or the negative examples can be augmented with data hand-labeled as constituting an intrinsically diverse session and/or not constituting an intrinsically diverse session. Likewise, it is to be appreciated that a combination of automated labeling and human oversight can be used. Yet, the claimed subject matter is not limited to the foregoing examples.

The query classifier training component 112 can extract a variety of features from the positive and negative examples of intrinsically diverse sessions. Examples of the features include, but are not limited to, query text, query statistics, query natural language processing (NLP) features, query topic, properties of queries appearing in a common session, properties of sessions in which a given query appears, a combination thereof, and so forth. For instance, the query text can be unigram counts (e.g., over a given fixed vocabulary of words). Moreover, the query statistics can include a number of words, a number of characters, clicks, impression count, click entropy, or the like. The query NLP features can include parts of speech, tag counts, etc. Moreover, query topic can be Open Directory Project (ODP) categories of top ranked results. Further, the properties of queries appearing in a common session can be an average similarity with co-session queries. Moreover, properties of sessions in which the query appears can be, for instance, an average length, a position within the session, or the like.

The query classifier training component 112 can use machine learning to train the query classifier to identify initiator queries that start an intrinsically diverse session and/or successor queries that are part of the intrinsically diverse session. According to an example, a linear support vector machine (SVM) can be used as a classification algorithm; however, other learning algorithms can alternatively be used.

Classifier labels can be binary (e.g., initiator query versus not an initiator query, etc.) and can come from membership in a set of extracted sessions based on heuristics. The extracted sessions can be from the intrinsically diverse session database 110 and/or the search log 106. Additionally or alternatively, the extracted sessions can be based on hand-labeled data, a combination of automated labeling and human oversight, and so forth. The heuristics, for instance, can be that first queries of regular search sessions (e.g., from the search log 106) are used as negative examples and positive examples comes from queries in the intrinsically diverse session database 110.

The system 100 can also include a default objective function training component 114 that can learn a model to optimize a default objective function. The default objective function can be utilized for a default ranking model to rank search results retrieved by a search engine (e.g., a search engine 126, etc.) responsive to executing a query (e.g., the query 124). The default objective function can be used in a procedure to rank the search results retrieved responsive to a non-intrinsically diverse query.

Moreover, the system 100 can include a related query database 116 that comprises related queries. For instance, the related query database 116 can be retained in a data repository (not shown).

The system 100 can further include an intrinsic diversity objective function training component 118 that can optimize a model or ranking procedure for an intrinsic diversity objective function. For instance, the intrinsic diversity objective function training component 118 can learn the parameters of a model optimized for an intrinsic diversity objective function based on the intrinsically diverse sessions from the intrinsically diverse session database 110, the related queries from the related query database 116, queries from the search log 106, and so forth.

The system 100 further includes a query classification component 120, which can receive user history 122 and the query 124 from a user. The query classification component 120 can employ the query classifier learned by the query classifier training component 112. More particularly, the query classification component 120 can identify one or more features of the query 124. Further, the query classification component 120 can determine, by employing the query classifier, whether the query is intrinsically diverse or not intrinsically diverse based on the one or more features of the query 124. According to an illustration, a feature of the query 124 may be that it is a plural form of a common word (e.g., "home decorating ideas," etc.), which can indicate that the user is looking for a broad set of search results as opposed to depth pertaining to one search result; thus, the query classification component 120 may predict whether such query is intrinsically diverse. The query classification component 120 can further determine whether the query is intrinsically diverse or not intrinsically diverse based on the user history 122 of the user, for example. Moreover, the query classification component 120 can use features derived from a user's session interactions so far (e.g., the user may have investigated several aspects thus far in the session) to determine whether the query 124 is intrinsically diverse or not intrinsically diverse.

For example, the query classification component 120 can use the query classifier to determine whether the query 124 is an intrinsically diverse query or is not an intrinsically diverse query. By way of a further example, the query classification component 120 can utilize the query classifier to determine whether the query 124 is an initiator query or is not an initiator query. According to another example, the query classification component 120 can employ the query classifier to determine whether the query 124 is an initiator query, a successor query, or a non-intrinsically diverse query. The foregoing determinations can be made based on the feature(s) of the query 124 identified by the query classification component 120. Based upon the determination made by the query classification component 120 utilizing the query classifier, presentation of search results can be customized and optimized as described herein.

The system 100 further includes a search engine 126 that receives the query 124. The search engine 126 can execute the query 124 to retrieve search results. Accordingly, the search engine 126 can compute standard search features.

The query classification component 120 can classify initiator and successor queries that represent intrinsically diverse information retrieval intents. The query classifier employed by the query classification component 120 can classify queries that are likely to indicate the start of an intrinsically diverse session (e.g., initiator queries) or subsequent intrinsically diverse queries (e.g., successor queries). By employing the classification yielded by the query classification component 120, the system 100 can be allowed to reliably customize and optimize results presentation, thereby allowing a user to find multiple, useful search results more efficiently during an intrinsically diverse session.

Moreover, the system 100 includes a default rank component 128, an optimization component 130, a presentation component 132, and a display screen 134. The default rank component 128 can utilize the default objective function learned by the default objective function training component 114, and the optimization component 130 can employ the intrinsic diversity objective function learned by the intrinsic diversity objective function training component 118. When the query classification component 120 determines that the query 124 is not an intrinsically diverse query, then the default rank component 128 can rank the search results retrieved by the search engine 126 responsive to executing the query 124 according to the default objective function. Accordingly, the presentation component 132 can present the search results on the display screen 134 as ranked by the default rank component 128 when the query 124 is determined to not be intrinsically diverse.

Moreover, when the query classification component 120 determines that the query 124 is an intrinsically diverse query, then the optimization component 130 can evaluate the intrinsic diversity objective function based at least upon the query 124 to compute an optimized value. Moreover, the optimization component 130 can cause the presentation component 132 to present the search results on the display screen 134 according to the optimized value when the query is determined to be intrinsically diverse. The optimized value is an approximation of an optimal solution; accordingly, presentation of the search results on the display screen can be enhanced by being based on the optimized value. The optimization component 130 can optimize search result presentation for intrinsically diverse queries. For instance, optimization of search result presentation on the display screen 134 can allow the user to find relevant documents for an intrinsically diverse information retrieval intent more efficiently. According to an example, the optimization component 130 can re-rank the search results returned by the search engine 126 responsive to executing the query 124. Additionally or alternatively, the optimization component 130 can optimize the choice of supplemental user interface elements (e.g., related queries, etc.), position of the supplemental user interface elements, and so forth.

Figure 2:
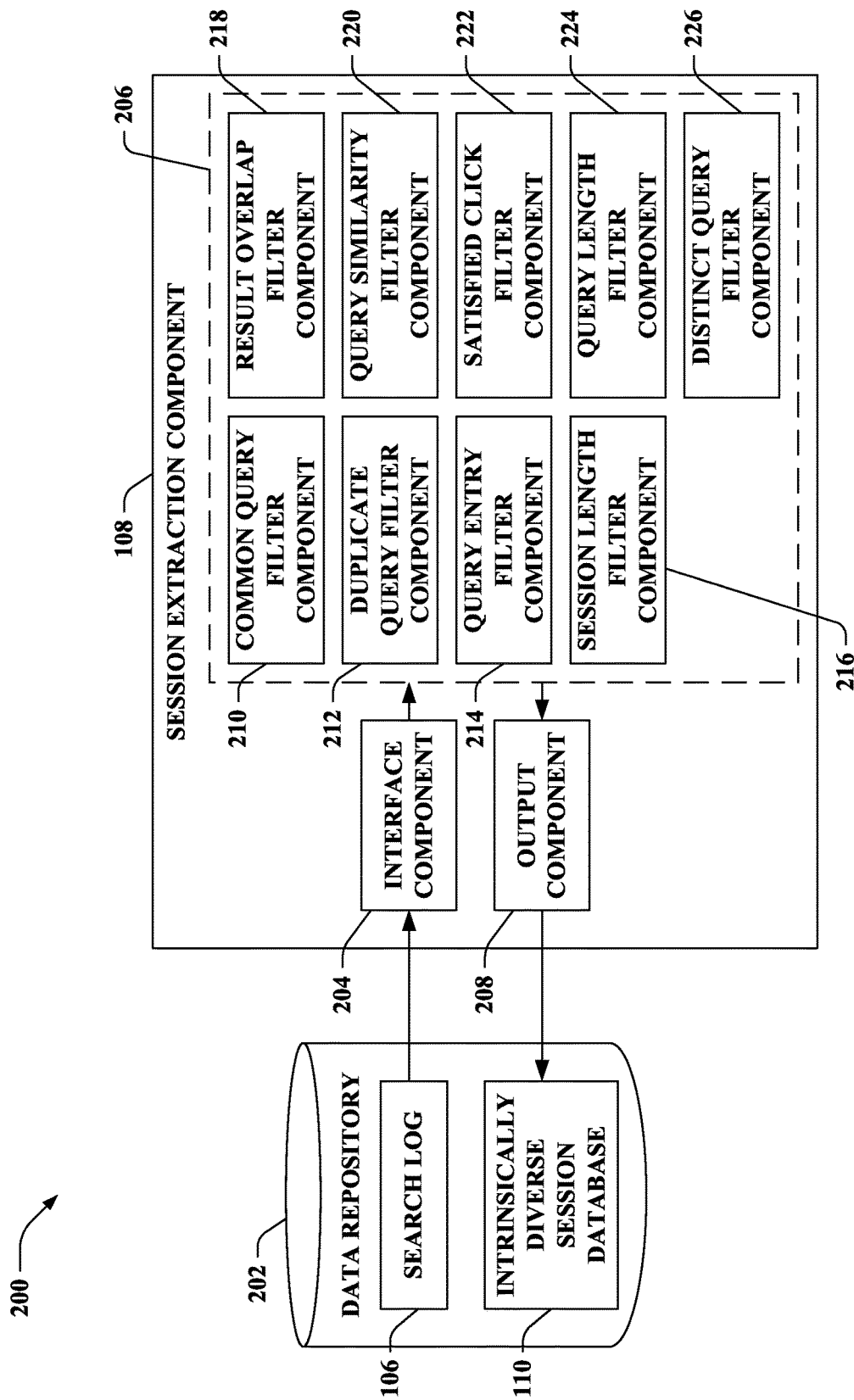
FIG. 2 illustrates a functional block diagram of an exemplary system that populates an intrinsically diverse session database.

Now turning to FIG. 2, illustrated is a system 200 that populates the intrinsically diverse session database 110. The system 200 includes a data repository 202, which can retain the search log 106 and the intrinsically diverse session database 110. The system 200 further includes the session extraction component 108. The session extraction component 108 can identify authentic examples of intrinsically diverse sessions, which can be utilized to model features of intrinsically diverse sessions. Further, the session extraction component 108 can employ an algorithm for automatically identifying the intrinsically diverse user sessions from the search log 106.

The session extraction component 108 includes an interface component 204 that accesses the search log 106. Moreover, the session extraction component 108 includes a set of filter components 206 that identifies intrinsically diverse sessions from the search log 106 by filtering the queries in the search log 106 to extract the intrinsically diverse sessions from the search log 106. Moreover, the session extraction component 108 includes an output component 208 that retains the intrinsically diverse sessions in the intrinsically diverse session database 110.

The set of filter components 206 can identify related queries that have a common topic across such queries. Moreover, the set of filter components 206 can filter simple reformulations or query alterations included in the search log 106.

The set of filter components 206 can include a common query filter component 210 that filters queries from the search log 106 having a frequency greater than a threshold frequency (e.g., top 100 queries by frequency). The common query filter component 210 can remove high-frequency queries along with variants of such queries. The high-frequency queries, for instance, may otherwise obscure behavior in a session. The variants of the high-frequency queries removed by the common query filter component 210 can be alternate forms of the high-frequency queries or the high-frequency queries with spelling errors. According to an example, if a top ranked search result returned for a high-frequency query is within a top two or three search results returned for a variant of the high-frequency query, then the common query filter component 210 can remove that variant of the high-frequency query.

Moreover, the set of filter components 206 can include a duplicate query filter component 212 that merges satisfied click results across duplicated queries in the search log 106. Accordingly, the duplicate query filter component 212 can enable duplicated queries to be removed with satisfied click results across the duplicated queries being merged.

The set of filter components 206 can further include a query entry filter component 214 that filters queries from the search log 106 that are not manually entered. Thus, manually entered queries can be included in the intrinsically diverse session database 110, whereas queries obtained via other methods (e.g., by clicking on a related query included in a user interface) are removed by the query entry filter component 214. The query entry filter component 214 provides that the user is knowingly navigating a path of an intrinsically diverse session.

The set of filter components 206 can further include a session length filter component 216 that filters sessions from the search log 106 that comprise less than a minimum number of intrinsically diverse queries. To increase session quality by amplifying the focus on sessions with diverse aspects, sessions with an initiator query and at least a minimum number of successor queries can be included in the intrinsically diverse session database 110. Thus, the session length filter component 216 can remove sessions having less than the minimum number of intrinsically diverse queries. According to an example, the minimum number can be five; following this example, a session having less than an initiator query and four successor queries can be removed by the session length filter component 216. According to another example, the minimum number of intrinsically diverse queries can be four; yet, it is contemplated that the minimum number of intrinsically diverse queries can be greater than five, less than four, etc. The session length filter component 216 can remove noisy examples and increase the quality of sessions included in the intrinsically diverse session database 110.

Moreover, the set of filter components 206 can include a result overlap filter component 218 that filters sessions from the search log 106 that include successor queries that return search results having less than a minimum overlap with search results returned by respective initiator queries. Since intrinsically diverse sessions can have a common topic and typically originate from a broader query, the result overlap filter component 218 can remove successor queries that lack at least a common top-m result with the initiator query, where m can be substantially any integer. Thus, the initiator query and the successor queries can share at least one common top-m result. Semantic relatedness can be provided by the result overlap filter component 218 by relying on results of a search engine (e.g., the search engine 126 of FIG. 1, etc.). For instance, the top-m results presented to the user during the session itself can be employed by the result overlap filter component 218; however, it is to be appreciated that the claimed subject matter is not so limited. Furthermore, it is contemplated that a filter for topic overlap can also be provided by use of a controlled ontology into which results have been placed by hand or via an automatic categorization tool.

The set of filter components 206 can further include a query similarity filter component 220 that filters sessions from the search log 106 that include successor queries having greater than a maximum syntactic similarity with respective initiator queries. Accordingly, the query similarity filter component 220 can restrict syntactic similarity with the initiator query to mitigate simple reformulations and spelling corrections, thereby allowing for other variations in intrinsically diverse queries to be explored. To measure query similarity, the query similarity filter component 220 can use cosine similarity with character trigrams; yet, the claimed subject matter is not so limited.

Moreover, the set of filter components 206 can include a satisfied click filter component 222 that filters sessions from the search log 106 that have less than a minimum number of satisfied clicks. Accordingly, the satisfied click filter component 222 can remove sessions lacking at least one satisfied click as an implicit indication that a user likes a document. The satisfied click filter component 222 can be employed since the quality of re-ranking session queries can be measured; thus, the satisfied click filter component 222 can enable obtaining relevant documents from each session.

The set of filter components 206 can also include a query length filter component 224 that filters sessions from the search log 106 that include queries having lengths greater than a threshold length. For instance, queries that are longer than the threshold length may be queries that are copied verbatim from a homework assignment. Such long queries may or may not enhance information retrieval when utilized to optimize search result presentation.

The set of filter components 206 can further include a distinct query filter component 226 that sorts sessions based on number of distinct successor queries. Thus, as a criterion for selecting a subset of sessions across a breadth of topics, a threshold on the number of distinct successor queries can be employed by the distinct query filter component 226. The distinct query filter component 226 can be employed to reduce the number of intrinsically diverse sessions retained in the intrinsically diverse session database 110 through sorting according to the number of distinct queries. Hence, breadth in topics considered can be maintained while selecting a subset of the sessions utilizing the distinct query filter component 226.

The set of filter components 206 can be applied to the search log 106 in series. The order of application of the filter components from the set of filter components 206 can be as follows: the common query filter component 210, the duplicate query filter component 212, the query entry filter component 214, the session length filter component 216, the result overlap filter component 218, the query similarity filter component 220, the satisfied click filter component 222, the query length filter component 224, then the distinct query filter component 226.

According to an example, it is to be appreciated that one or more of the filter components shown in the set of filter components 206 in FIG. 2 can be optional. By way of illustration, the session length filter component 216, the result overlap filter component 218, and the query similarity filter component 220 can be utilized to find the intrinsically diverse sessions for the intrinsically diverse session database 110, while one or more of the remaining filter components (e.g., the common query filter component 210, the duplicate query filter component 212, the query entry filter component 214, the satisfied click filter component 222, the query length filter component 224, and the distinct query filter component 226) can be omitted. It is contemplated, for instance, that the common query filter component 210, the duplicate query filter component 212, the query entry filter component 214, the satisfied click filter component 222, the query length filter component 224, and the distinct query filter component 226 can be used to reduce noise, increase precision, refine the evaluation, etc. of the session length filter component 216, the result overlap filter component 218, and the query similarity filter component 220. Moreover, it is contemplated that other filter components in addition to those depicted in FIG. 2 can fall within the scope of the hereto appended claims.

Figure 3:
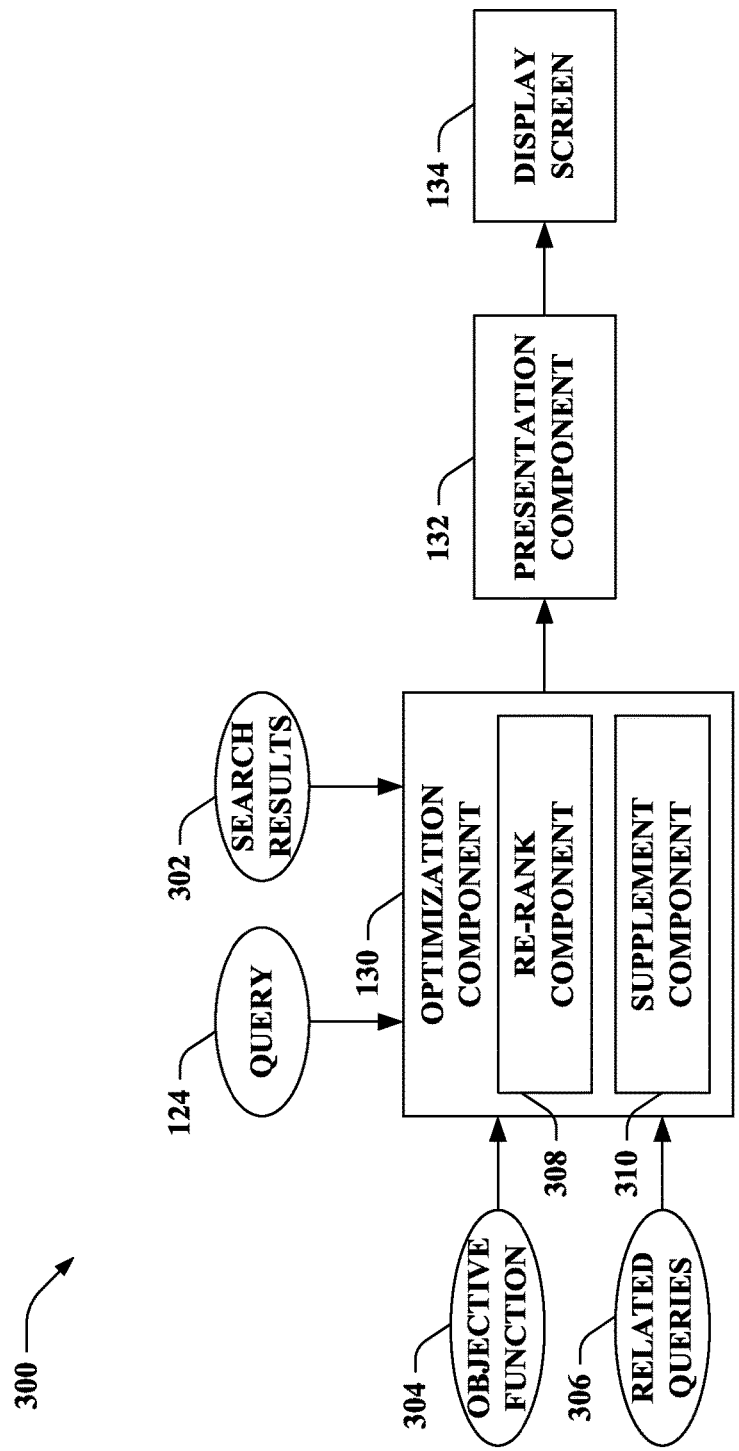
FIG. 3 illustrates a functional block diagram of an exemplary system that presents search results returned responsive to executing a query.

With reference to FIG. 3, illustrated is a system 300 that presents search results 302 returned responsive to executing a query. The system 300 includes the optimization component 130, the presentation component 132, and the display screen 134. The optimization component 130 can receive the search results 302 retrieved by the search engine 126 of FIG. 1 responsive to executing the query 124. Moreover, the optimization component 130 can receive the query 124 as well as an indication that the query 124 is an intrinsically diverse query provided by the query classification component 120 of FIG. 1. Further, the optimization component 130 can obtain an objective function 304 (e.g., the intrinsic diversity objective function) learned by the intrinsic diversity objective function training component 118 of FIG. 1 and related queries 306 from the related query database 116 of FIG. 1. The related queries 306 pertain to the query 124. The optimization component 130, for example, can retrieve the related queries 306 from the related query database 116 of FIG. 1.

When the query 124 is determined to be intrinsically diverse (e.g., as specified by the query classification component 120), the optimization component 130 can evaluate the objective function 304 based at least upon the query 124 to compute an optimized value. Moreover, the optimization component 130 can cause the presentation component 132 to present the search results on the display screen 134 according to the optimized value.

The optimization component 130 can include a re-rank component 308 that can re-rank search results according to the optimized value; thus, the re-rank component 308 can cause the presentation component 132 to present the re-ranked search results on the display screen 134. Moreover, the optimization component 130 can include a supplement component 310 that can select and/or position supplemental user interface elements (e.g., selected related queries) according to the optimized value; hence, the supplement component 310 can cause the presentation component 132 to present the supplemental user interface elements on the display screen 134 with the search results. Re-ranking by the re-rank component 308 and/or supplemental user interface elements provided by the supplement component 310 can be displayed on the display screen 134 to enable finding relevant documents faster for a particular intrinsically diverse information retrieval intent.

The optimization component 130 can optimize presentation of the search results 302 to enable a user to find relevant documents more efficiently for a given intrinsically diverse information retrieval intent. Given a query $q_0$ (e.g., the query 124) that gives results with document ranking $D_0=\{d_{1,0}, d_{2,0}, \ldots, d_{K,0}\}$ and a corresponding set of related queries $Q_0=\{q'_1, q'_2, \ldots, q'_K\}$ (e.g., the related queries 306), with query $q'_i$ (e.g., a related query from the related queries 306) giving results $D_i=\{d_{1,i}, d_{2,i}, \ldots, d_{K,i}\}$. According to an example, if the query classification component 120 detects that the query $q_0$ (e.g., the query 124) is an initiator query for an intrinsically diverse session, then the optimization component 130 can invoke the below algorithm to optimize search result presentation.

It is contemplated that various forms of the objective function 304 (e.g., the intrinsic diversity objective function) are intended to fall within the scope of the hereto appended claims. By way of example, optimal documents D and related queries Q can have a highest aggregate score S(D, Q) (e.g., the optimized value), where the objective function 304 can have the following general form.

$$S(D, Q) = \sum_{i=1}^{K} \gamma_i \, \text{Relevance}(d_{i,0} | q) \cdot \text{Relevance}(d_{i,0} | q'_i) \cdot \text{Related}_Q(q'_i | q)$$

The relevance function Relevance $(d_{i,0}|q)$ and the relevance function Relevance $(d_{i,0}|q'_i)$ can estimate how relevant a document d is to a query q. Such functions can be learned (e.g., by the intrinsic diversity objective function training component 118 of FIG. 1) via machine learning (e.g., learning-to-rank), using training data labeled with implicit and/or explicit relevance judgments and features extracted from queries, websites, URLs, anchor text and/or other sources in training data. According to an example, the relevance functions can be trained using a logistic regression model to provide Pr (dig); yet, the claimed subject matter is not so limited.

Moreover, the relatedness function $\text{Related}_Q(q'_i|q)$ can estimate how related or similar a query q is to a query $q'_i$. The relatedness function can be implemented in various manners and can be used to balance relatedness between a query $q'_i$ under consideration to q and diversity of the set of queries, $q_1 \ldots q_{i-1}$, chosen thus far. For instance, the relatedness function can be learned from data (e.g., via machine learning, by the intrinsic diversity objective function training component 118 of FIG. 1, etc.). Further, the relatedness function can incorporate different features and/or sources of evidence about the relatedness of the two queries. By way of example, the relatedness function can be a maximum marginal relevance (MMR) represented as follows:

$$\text{Related}_Q(q' | q) = e^{\beta(\lambda \text{Sim}(q, \text{Snip}(q'))-(1-\lambda)\max_{q_1, \ldots, q_{i-1}} \text{Sim}(\text{Snip}(q_i), \text{Snip}(q')))}$$

The term in the exponent in the foregoing is an MMR term to allow for diversity in related queries suggested. The term is exponentiated to provide a positive value. In the above equation, Sim(q, Snip (q')) measures relevance between snippets of search results (e.g., returned responsive to executing the related query q') and the query q, and Sim (Snip ($q_i$), Snip (q')) measures similarities between two snippets of search results. While similarities based on snippet similarity are presented as an example, other similarities (e.g., based on textual content of the results, anchor text, query text, etc.) are contemplated. Further, $\lambda$ is a value that sets a tradeoff between relevance and similarity; for instance, the value of $\lambda$ can be learned or set appropriate to an application.

Moreover, the objective function 304 can include a weight $\gamma_i$ that can be used to discount the importance of a document $d_i$ at a rank position i. The weight $\gamma_i$, for example, can be set via use of interaction data (e.g., data indicating how likely a user is to scroll to or see a document at position i).

Accordingly, the score S(D, Q) (e.g., the optimized value) can have the effect of rewarding documents that are relevant to the initiator query. Further, the score S(D, Q) (e.g., the optimized value) can have the effect of rewarding documents that are relevant to one or more of the related queries 306. Moreover, the score S(D, Q) (e.g., the optimized value) can give more weight to those related queries 306 that have a desired relationship to the initiator query (e.g., covering a more diverse set of topics).

The optimization component 130 can compute the optimized value S(D, Q) based upon the evaluation of the objective function 304. Based upon the optimized value, the re-rank component 308 can determine the document ranking D and/or the supplement component 310 can determine the related queries Q. Thus, the re-rank component 308 can cause the presentation component 132 to present the re-ranked search results on the display screen 134 based upon the optimal document ranking D determined from the optimized value. Additionally or alternatively, the supplement component 310 can cause the presentation component 132 to present the related queries Q on the display screen 134, where the related queries Q are determined from the optimized value to be relevant to the query 124 while redundancy between the related queries Q can be mitigated. Further, it is contemplated that the supplement component 310 can control positioning of the related queries Q on the display screen 134 based upon the optimized value.

Pursuant to the example provided above, the objective function 304 can be based on the relevance function that rewards the search results 302 based on relevance to the query 124, the relevance function that rewards the search results 302 based on relevance to one or more of the related queries 306, and the relatedness function that rewards relevance and penalizes redundancy of related queries 306 at least with respect to the query 124. The relatedness function, for instance, can reward relevance with respect to the query 124 and can penalize redundancy of related queries 306 with respect to the set of related queries 306. Various other exemplary forms of the objective function 304 are set forth below. As provided below, various terms can be removed from the form of the objective function 304 provided above. According to an example, the objective function 304 can be based on the relatedness function that rewards relevance and penalizes redundancy of related queries 306 at least with respect to the query 124. In accordance with another example, it is contemplated that the objective function 304 can be based on a relevance function that rewards the search results 302 based on relevance to one or more of the related queries 306 and the relatedness function that rewards relevance and penalizes redundancy of related queries 306 at least with respect to the query 124.

As described above, in accordance with an example, the objective function 304 can be based on the relatedness function that rewards relevance and penalizes redundancy of related queries 306 at least with respect to the query 124. Following this example, the optimization component 130 can employ this form of the objective function 304 to provide diversity across queries. Thus, the presentation of the search results on the display screen 134 according to the optimized value caused by the optimization component 130 can include the supplement component 310 selecting related queries 306 based on the optimized value computed by the optimization component 130 based on the evaluation of the objective function 304. Moreover, the optimization component 130 can cause the search results 302 and the selected related queries 306 to be displayed on the display screen 134 without the search results 302 being re-ranked or the selected related queries 306 being positioned based upon a relevance measure; thus, the selected related queries 306 can be presented with a previously computed static, first-level ranking (e.g., agnostic to the relevance terms). Following this example, the form of the objective function 304 (DynA) can be as follows:

$$DynA(q, d_1, d_2, \ldots, d_n)_{\lambda,\beta} = $$
$$\mathrm{argmax}_{q_1,q_2,\ldots,q_n} \left( \sum_{i=1}^{n} \gamma_i \cdot \exp(\beta(\lambda Sim(q_i, Snip(q')) - $$
$$(1-\lambda)\max_{j<i} Sim(Snip(q_i), Snip(q_j)))) \right)$$

In accordance with another example, the objective function 304 can be based on a relevance function that rewards the search results 302 based on relevance to one or more of the related queries 306 and the relatedness function that rewards relevance and penalizes redundancy of related queries 306 at least with respect to the query 124. Pursuant to this example, the optimization component 130 can employ this form of the objective function 304 to provide diversity across queries and relevance between the search results 302 and the selected related queries 306 presented next to such search results 302. Accordingly, the presentation of the search results 302 on the display screen 134 according to the optimized value caused by the optimization component 130 can include the supplement component 310 selecting the related queries 306 based on the optimized value computed by the optimization component 130 based on the evaluation of the objective function 304. Moreover, the supplement component 310 can determine relevance measures of the search results 302 to the selected related queries 306 based on the optimized value as computed. The optimization component 130 can cause the search results 302 and the selected related queries 306 to be displayed on the display screen 134, where the selected related queries 306 are positioned relative to the search results 302 on the display screen 134 based upon the relevance measures of the search results 302 to the selected related queries 306. Thus, a previously computed static, first-level ranking can again be utilized without re-ranking. According to this example, the form of the objective function 304 (DynS) can be as follows:

$$DynS(q, d_1, d_2, \ldots, d_n)_{\lambda,\beta} = $$
$$\mathrm{argmax}_{q_1,q_2,\ldots,q_n} \left( \sum_{i=1}^{n} \gamma_i \cdot P(d_i \mid q_i) \cdot \exp(\beta(\lambda Sim(q_i, Snip(q')) - $$
$$(1-\lambda)\max_{j<i} Sim(Snip(q_i), Snip(q_j)))) \right)$$

According to another example, the objective function 304 can be based on the relevance function that rewards the search results 302 based on relevance to the query 124, the relevance function that rewards the search results 302 based on relevance to one or more of the related queries 306, and the relatedness function that rewards relevance and penalizes redundancy of related queries 306 at least with respect to the query 124. Following this example, the presentation of the search results 302 on the display screen 134 according to the optimized value caused by the optimization component 130 can include the re-rank component re-ranking the search results 302 retrieved by the search engine (e.g., the search engine 126 of FIG. 1) responsive to executing the query 124 based on the optimized value. Moreover, the optimization component 130 can cause the search results 302 to be displayed on the display screen 134 as re-ranked. Following this example, the form of the objective function 304 (DynRR) can be as follows:

$$DynRR(q)_{\lambda,\beta} = $$
$$\mathrm{argmax}_{q_1,q_2,\ldots,q_n,d_1,d_2,\ldots,d_n} \left( \sum_{i=1}^{n} \gamma_i \cdot P(d_i \mid q) \cdot P(d_i \mid q_i) \cdot \exp(\beta(\lambda Sim(q_i, $$
$$Snip(q')) - (1-\lambda)\max_{j<i} Sim(Snip(q_i), Snip(q_j)))) \right)$$

Pursuant to an illustration, the foregoing exemplary form of the objective function 304 can be utilized to re-rank the search results 302 and cause the search results 302 to be displayed on the display screen 134 as re-ranked without selecting related queries or positioning such related queries based upon relevance measures. In accordance with another illustration, the foregoing exemplary form of the objective function 304 can be utilized to re-rank the search results 302 as well as select related queries 306, determine the relevance measures, and position the selected related queries 306 relative to the search results 302 based upon the relevance measures as described above.

Figure 4:
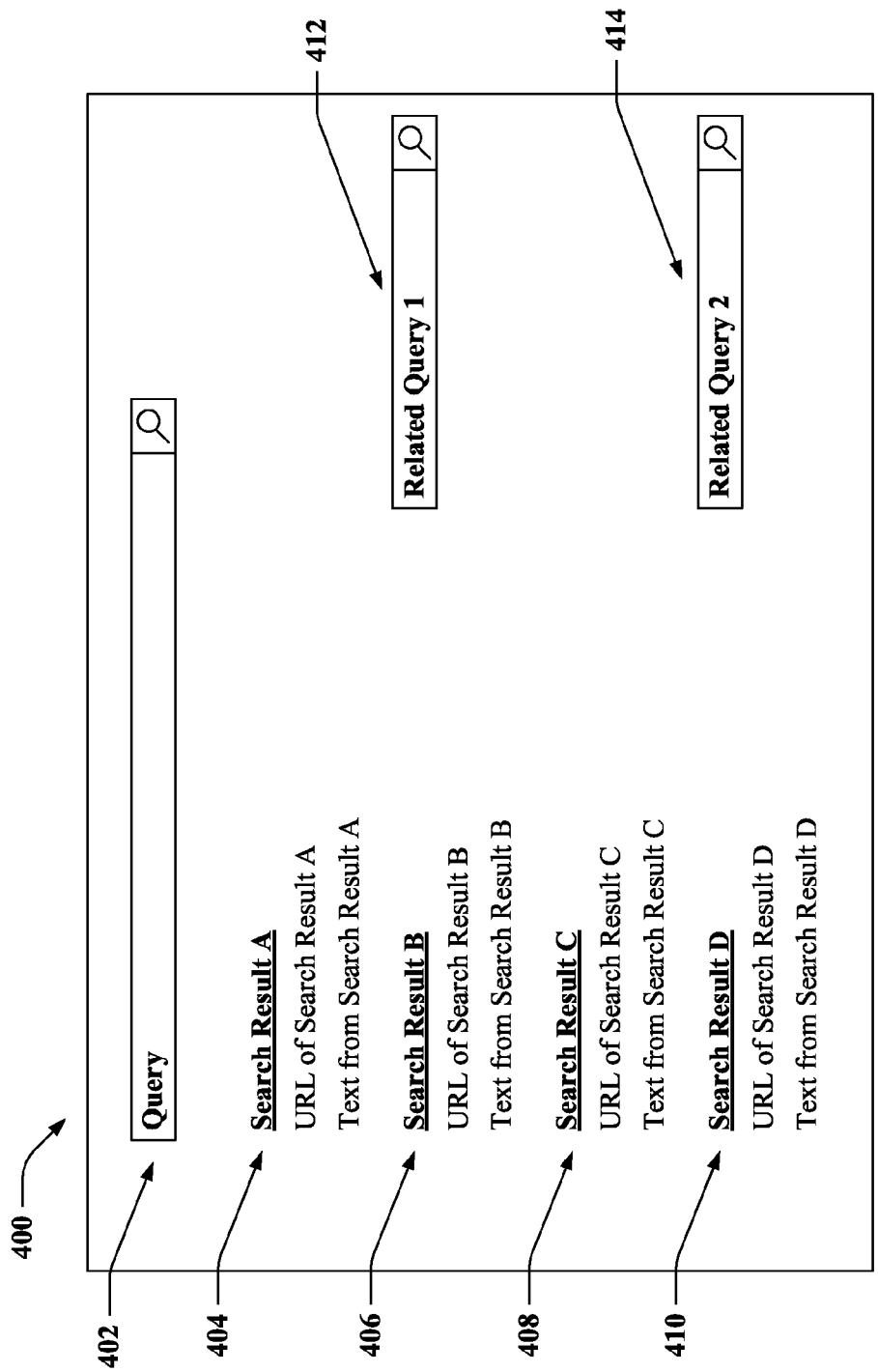
FIG. 4 illustrates an exemplary user interface that can be presented on a display screen.

Now turning to FIG. 4, illustrated is an exemplary user interface 400 that can be presented on a display screen. For example, the optimization component 130 can cause the presentation component 132 to present the user interface 400 on the display screen 134.

The user interface 400 includes a query 402. Moreover, as shown in FIG. 4, the user interface 400 includes search results, namely, a search result 404, a search result 406, a search result 408, and a search result 410 (collectively referred to as search results 404-410). Moreover, the user interface 400 includes related queries: a related query 412 and a related query 414 (collectively referred to as related queries 412-414). User selection of one of the related queries 412-414 can launch that related query, thereby causing search results pertaining to the related query to be presented, etc. While the user interface 400 of FIG. 4 depicts four search results 404-410 and two related queries 412-414, it is contemplated that substantially any other number of search results and/or related queries can be included in the user interface 400.

According to an example, the search results 404-410 included in the user interface 400 can be re-ranked (e.g., by the re-rank component 308) based on the optimized value and the related queries 412-414 can be selected (e.g., by the supplement component 310) based on the optimized value as described above. Pursuant to this example, the related queries 412-414 can be positioned relative to the search results 404-410 in the user interface 400 based upon relevance measures of the search results 404-410 to the related queries 412-414. As illustrated in FIG. 4, the related query 412 is positioned next to the search result 406 and the related query 414 is positioned next to the search result 410; thus, the positioning in the user interface 400 can be based upon a relevance measure of the search result 406 to the related query 412 and a relevance measure of the search result 410 to the related query 414, which signify that the search result 406 is particularly relevant to the related query 412 and the search result 410 is particularly relevant to the related query 414.

In accordance with another example, the search results 404-410 included in the user interface 400 may not be re-ranked. Following this example, the related queries 412-414 can be selected (e.g., by the supplement component 310) based on the optimized value as described above. Again, the related queries 412-414 can be positioned relative to the search results 404-410 (e.g., not re-ranked in this example) in the user interface 400 based upon the relevance measures of the search results 404-410 to the related queries 412-414 as described above.

Figure 5:
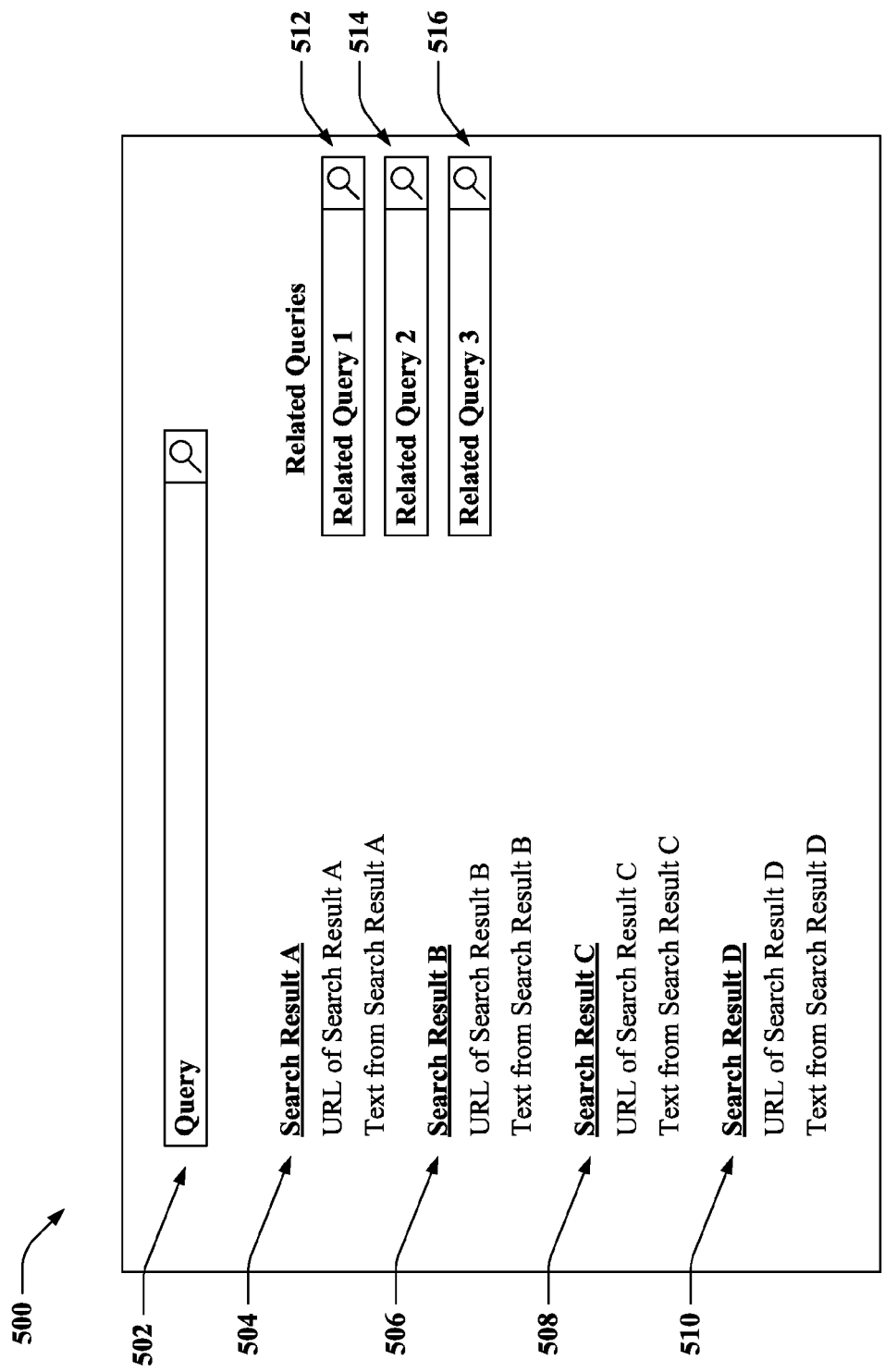
FIG. 5 illustrates another exemplary user interface that can be presented on a display screen.

With reference to FIG. 5, illustrated is another exemplary user interface 500 that can be presented on a display screen. Pursuant to an example, the optimization component 130 can cause the presentation component 132 to present the user interface 500 on the display screen 134.

The user interface 500 includes a query 502. Further, the user interface 500 includes search results, namely, a search result 504, a search result 506, a search result 508, and a search result 510 (collectively referred to as search results 504-510). The user interface 500 also includes related queries, namely, a related query 512, a related query 514, and a related query 516 (collectively referred to as related queries 516). While the user interface 500 of FIG. 5 depicts four search results 504-510 and three related queries 512-516, it is contemplated that substantially any other number of search results and/or related queries can be included in the user interface 500.

Pursuant to an example, the related queries 512-516 can be selected (e.g., by the supplement component 310) based on the optimized value as described above. However, following this example, the search results 504-510 are not re-ranked and the related queries 512-516 are not positioned relative to the search results 504-510 in the user interface 500 based upon relevance measures. Since the positioning of the related queries 512-516 is not based upon the relevance measures in accordance with this example, the related queries 512-516 may be presented in the user interface 500 next to unrelated search results 504-510.

Figure 6:
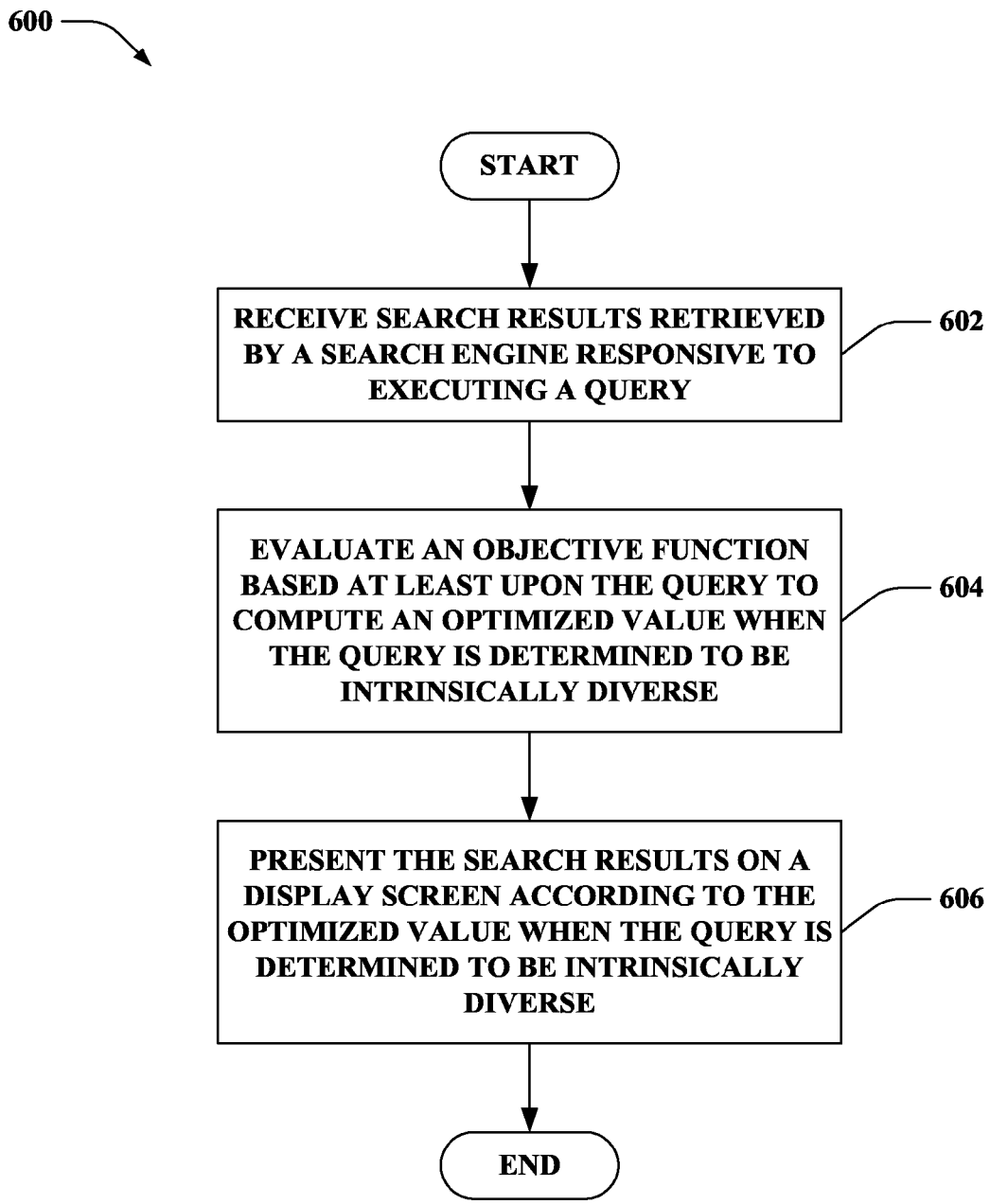
FIG. 6 is a flow diagram that illustrates an exemplary methodology of presenting search results returned responsive to executing a query.
Figure 7:
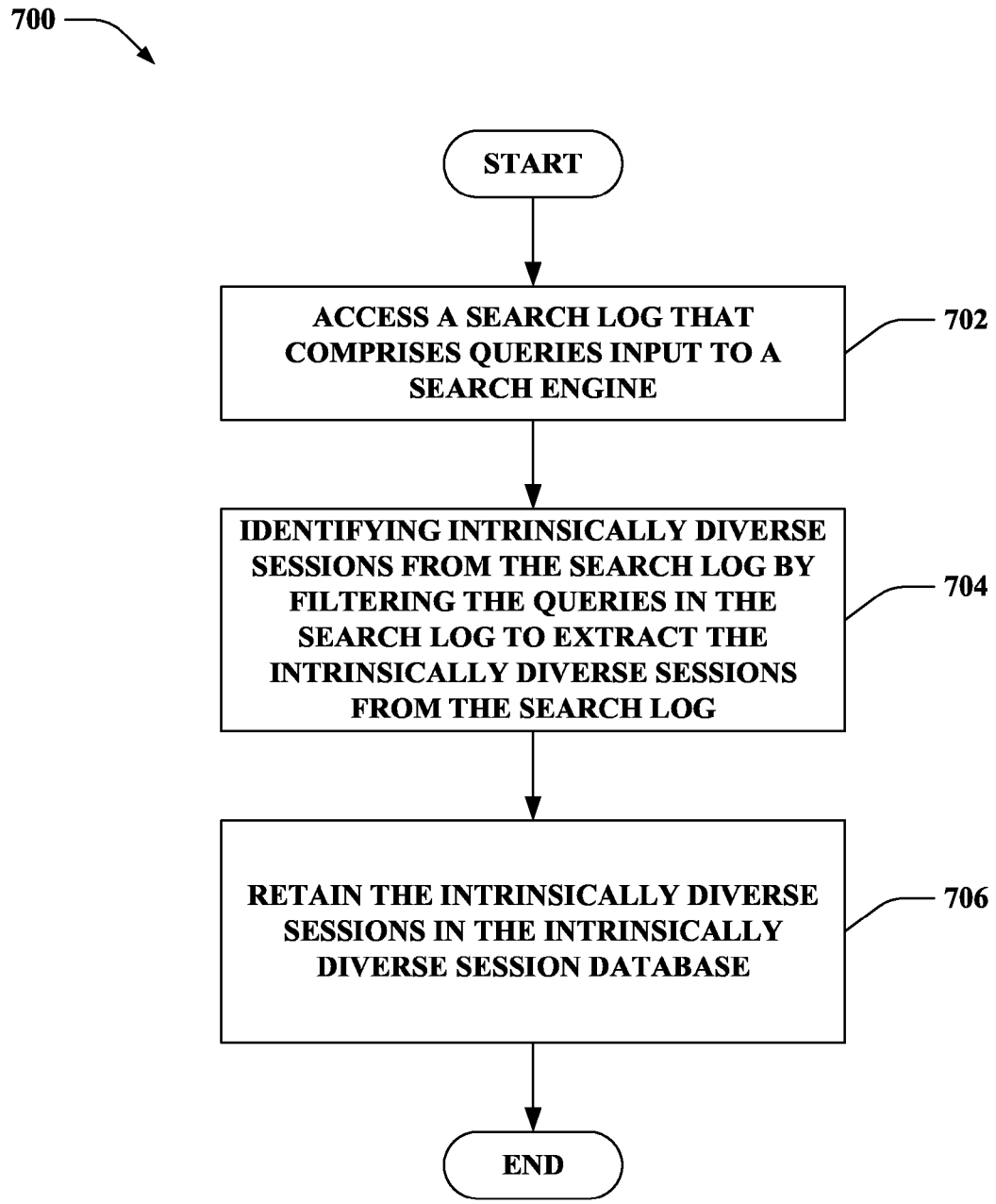
FIG. 7 is a flow diagram that illustrates an exemplary methodology of populating an intrinsically diverse session database.
Figure 8:
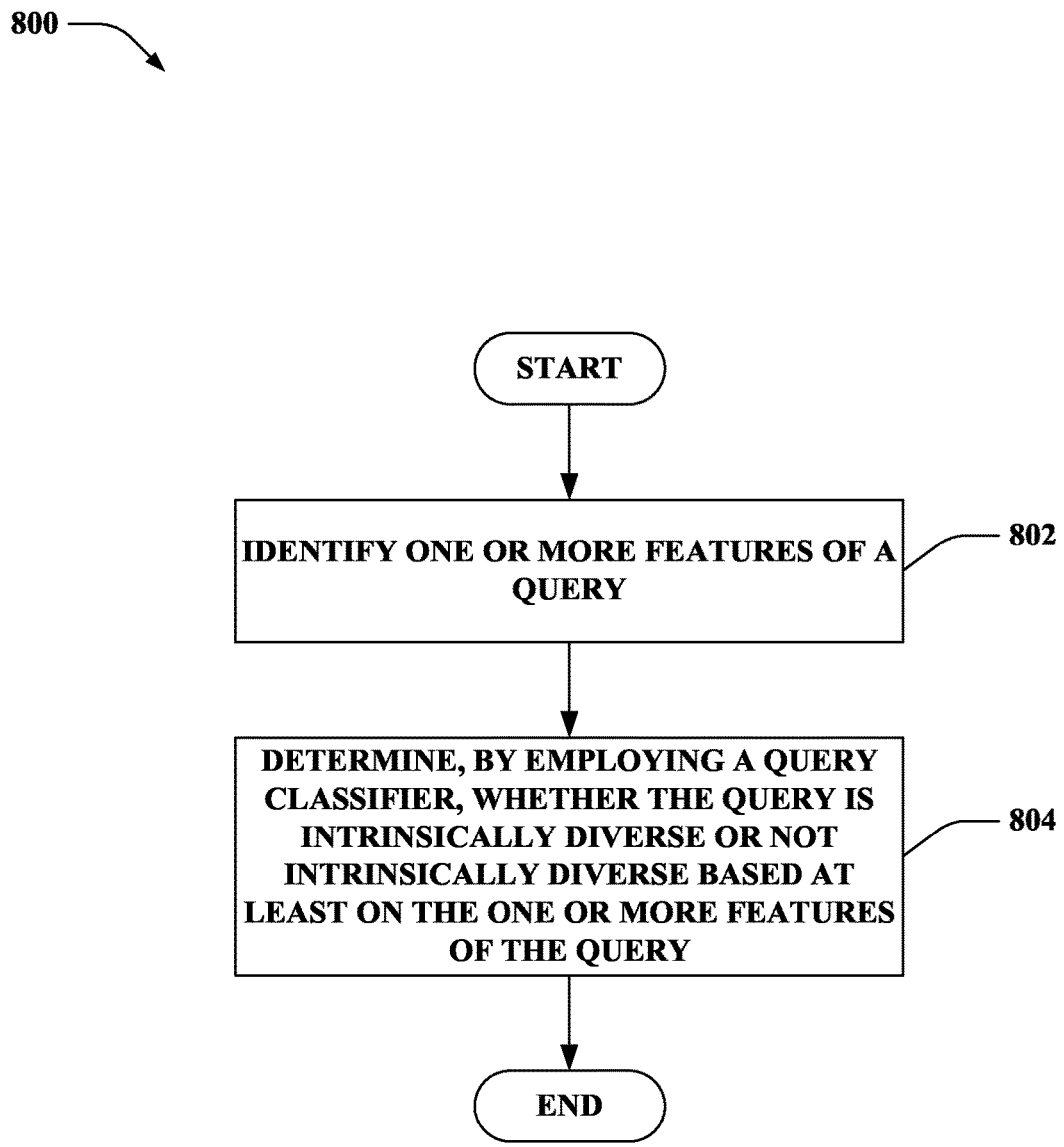
FIG. 8 is a flow diagram that illustrates an exemplary methodology of classifying a query.

FIGS. 6-8 illustrate exemplary methodologies relating to predicting intrinsically diverse sessions and retrieving information for such intrinsically diverse sessions. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 6 illustrates a methodology 600 of presenting search results returned responsive to executing a query. At 602, search results retrieved by a search engine responsive to executing the query can be received. At 604, an objective function can be evaluated based at least upon the query to compute an optimized value when the query is determined to be intrinsically diverse. The query can be intrinsically diverse when included in an intrinsically diverse session directed towards a task. Moreover, the query and disparate queries included in the intrinsically diverse session can be directed towards respective subtasks of the task. At 606, the search results can be presented on a display screen according to the optimized value when the query is determined to be intrinsically diverse.

Now turning to FIG. 7, illustrated is a methodology 700 of populating an intrinsically diverse session database. At 702, a search log that comprises queries input to a search engine can be accessed. At 704, intrinsically diverse sessions can be identified from the search log by filtering the queries in the search log to extract the intrinsically diverse sessions from the search log. For example, a series of filters can be applied to extract the intrinsically diverse sessions from the search log. At 706, the intrinsically diverse sessions can be retained in the intrinsically diverse session database.

With reference to FIG. 8, illustrated is a methodology 800 of classifying a query. At 802, one or more features of the query can be identified. At 804, whether the query is intrinsically diverse or not intrinsically diverse can be determined, by employing a query classifier, based at least on the one or more features of the query. Moreover, the query classifier can also use features derived from a user's session interactions so far (e.g., the user may have investigated several aspects thus far in the session) to determine whether the query is intrinsically diverse or not intrinsically diverse.

Figure 9:
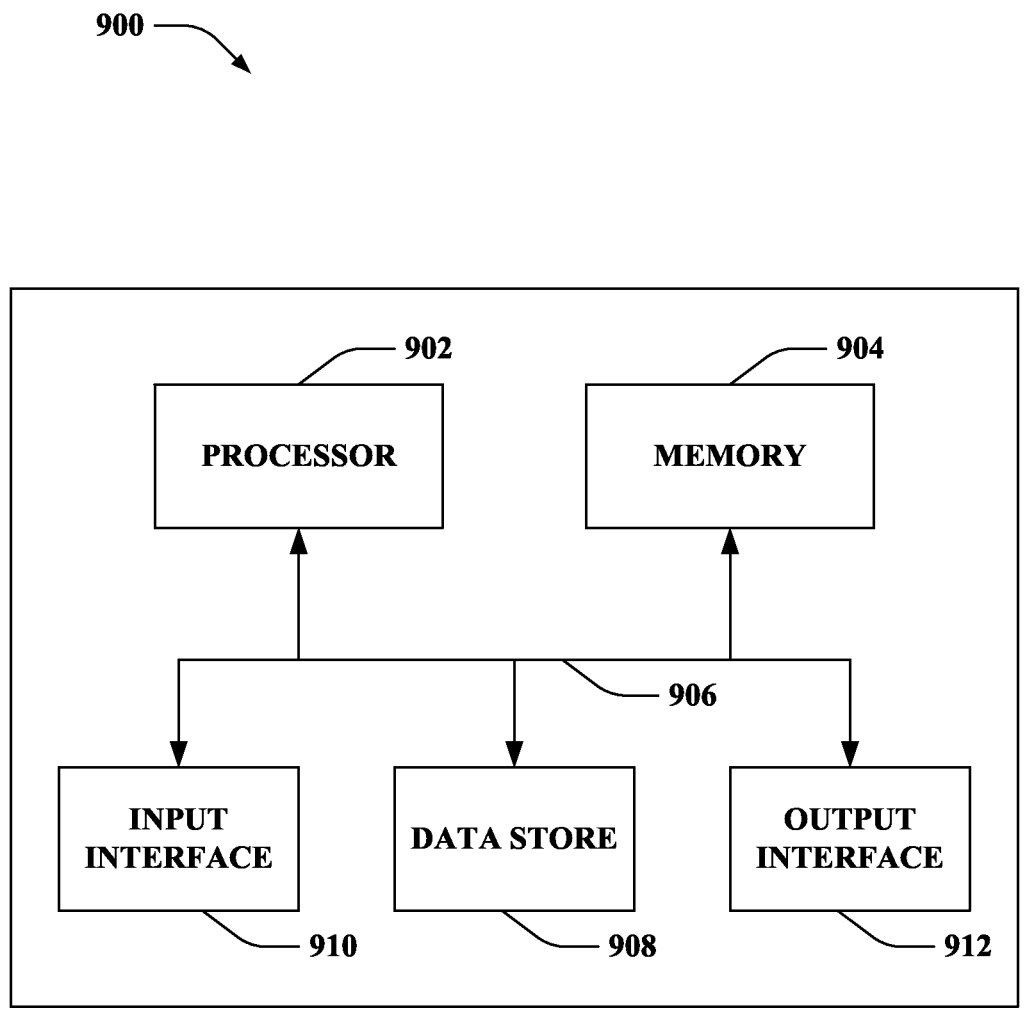
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be used in a system that optimizes search result presentation for intrinsically diverse queries. By way of another example, the computing device 900 can be used in a system that classifies queries that represent intrinsically diverse information retrieval intents. In accordance with a further example, the computing device 900 can be used in a system that extracts intrinsically diverse sessions from a search log (e.g., the search log 106 of FIG. 1). The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store a search log, an intrinsically diverse session database, a query classifier, objective function(s), a related query database, search results, and so forth.

The computing device 900 additionally includes a data store 908 that is accessible by the processor 902 by way of the system bus 906. The data store 908 may include executable instructions, a search log, an intrinsically diverse session database, a query classifier, objective function(s), a related query database, search results, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of presenting search results returned responsive to executing a query, comprising:
    determining, by employing a query classifier, whether the query is intrinsically diverse or not intrinsically diverse, wherein the query is intrinsically diverse when included in an intrinsically diverse session, wherein the intrinsically diverse session is directed towards a task, and wherein queries included in the intrinsically diverse session are directed towards respective subtasks of the task;
    receiving the search results retrieved by a search engine responsive to executing the query, wherein related queries correspond to the search results;
    evaluating an objective function to compute an optimized value in response to the query being determined to be intrinsically diverse, wherein:
        the objective function is based on relevance of differing search results to the query, the differing search results returned responsive to the related queries; and
        the objective function is based on redundancy between the related queries; and
    controlling presentation of the search results on a display screen according to the optimized value when the query is determined to be intrinsically diverse.

2. The method of claim 1, wherein the objective function is further based on relevance of the search results to one or more of the related queries.

3. The method of claim 2, wherein the objective function is further based on relevance of the search results to the query.

4. The method of claim 1, wherein controlling the presentation of the search results on the display screen according to the optimized value when the query is determined to be intrinsically diverse further comprises:
    selecting one or more of the related queries to be selected related queries, the selected related queries being selected based on the optimized value; and
    causing the search results and the selected related queries to be displayed on the display screen.

5. The method of claim 1, wherein controlling the presentation of the search results on the display screen according to the optimized value when the query is determined to be intrinsically diverse further comprises:
    selecting one or more of the related queries to be selected related queries, the selected related queries being selected based on the optimized value;
    determining relevance measures of the search results to the selected related queries based on the optimized value; and
    causing the search results and the selected related queries to be displayed on the display screen, wherein the selected related queries are positioned relative to the search results on the display screen based upon the relevance measures of the search results to the selected related queries.

6. The method of claim 1, wherein controlling the presentation of the search results on the display screen according to the optimized value when the query is determined to be intrinsically diverse further comprises:
    re-ranking the search results retrieved by the search engine responsive to executing the query, the search results being re-ranked based on the optimized value; and
    causing the search results to be displayed on the display screen as re-ranked.

7. The method of claim 1, wherein controlling the presentation of the search results on the display screen according to the optimized value when the query is determined to be intrinsically diverse further comprises:
    selecting one or more of the related queries to be selected related queries, the selected related queries being selected based on the optimized value;
    determining relevance measures of the search results to the selected related queries based on the optimized value;
    re-ranking the search results retrieved by the search engine responsive to executing the query, the search results being re-ranked based on the optimized value; and
    causing the search results and the selected related queries to be displayed on the display screen, wherein the search results are displayed on the display screen as re-ranked, and wherein the selected related queries are positioned relative to the search results on the display screen based upon the relevance measures of the search results to the selected related queries.

8. The method of claim 1, further comprising:
    identifying one or more features of the query; and
    determining, by employing the query classifier, whether the query is intrinsically diverse or not intrinsically diverse based at least on the one or more features of the query.

9. The method of claim 1, further comprising:
    identifying one or more features of the query; and
    determining, by employing the query classifier, whether the query is one of an initiator query, a successor query, or a non-intrinsically diverse query based on the one or more features of the query, wherein a first query in the intrinsically diverse session is the initiator query, and wherein remaining queries in the intrinsically diverse session other than the initiator query are successor queries.

10. A system that populates an intrinsically diverse session database for training a query classifier, comprising:
    a data repository that retains a search log that comprises queries inputted to a search engine and the intrinsically diverse session database;
    one or more processors; and
    memory that comprises computer-executable instructions that, when executed by the one or more processors, cause the one or more processors to perform acts comprising:
        accessing the search log;
        identifying intrinsically diverse sessions from the search log, the intrinsically diverse sessions being identified by filtering the queries in the search log to extract the intrinsically diverse sessions from the search log, filtering the queries to extract the intrinsically diverse sessions from the search log comprising:
            removing sessions from the search log that comprise an initiator query and less than a minimum number of successor queries, wherein an initiator query is a first query of a session and remaining queries in the session other than the initiator query are successor queries;
            removing sessions from the search log that comprise successor queries that return search results having less than a minimum overlap with search results returned by respective initiator queries; and removing sessions from the search log that comprise successor queries having greater than a maximum syntactic similarity with respective initiator queries;

retaining the intrinsically diverse sessions in the intrinsically diverse session database; and training the query classifier based upon features of the intrinsically diverse sessions from the intrinsically diverse session database, wherein the query classifier is trained to identify whether a query inputted to the search engine is an intrinsically diverse query.

11. The system of claim 10, filtering the queries to extract the intrinsically diverse sessions from the search log further comprising at least one of:

removing queries from the search log having a frequency greater than a threshold frequency;

merging satisfied click results across duplicated queries in the search log;

removing queries from the search log that are not manually entered;

removing sessions from the search log that have less than a minimum number of satisfied clicks;

removing sessions from the search log that include queries having lengths greater than a threshold length; or sorting sessions based on number of distinct successor queries.

12. The system of claim 10, wherein the features of the intrinsically diverse sessions comprise at least one of query text, a query statistic, a query natural language processing (NLP) feature, a query topic, a property of queries appearing in a common session, or a property of sessions in which a given query appears.

13. A computer-readable storage device including computer-executable instructions that, when executed by a processor, cause the processor to perform acts including:

identifying one or more features of a query;

determining, by employing a query classifier, whether the query is intrinsically diverse or not intrinsically diverse based on the one or more features of the query, wherein the query is intrinsically diverse when included in an intrinsically diverse session, wherein the intrinsically diverse session is directed towards a task, and wherein queries included in the intrinsically diverse session are directed towards respective subtasks of the task;

receiving search results retrieved by a search engine responsive to executing the query;

receiving related queries that correspond to the search results;

evaluating an objective function to compute an optimized value when the query is determined to be intrinsically diverse, wherein:

the objective function is based on relevance of differing search results to the query, the differing search results returned responsive to the related queries; and the objective function is based on redundancy between the related queries; and controlling presentation of the search results on a display screen according to the optimized value when the query is determined to be intrinsically diverse.

14. The computer-readable storage device of claim 13, wherein the query classifier is trained based upon features of intrinsically diverse sessions from an intrinsically diverse session database.

15. The computer-readable storage device of claim 13, wherein the one or more features of the query comprise at least one of text of the query, a statistic of the query, a natural language processing (NLP) feature of the query, a topic of the query, a property of queries appearing in a common session with the query, or a property of sessions in which the query appears.

16. The method of claim 1, the redundancy between the related queries being based on similarities between snippets of the differing search results returned responsive to the related queries.

17. The computer-readable storage device of claim 13, wherein:

the objective function is further based on relevance of the search results to one or more of the related queries; and the objective function is further based on relevance of the search results to the query.

18. The computer-readable storage device of claim 13, wherein controlling the presentation of the search results on the display screen according to the optimized value when the query is determined to be intrinsically diverse further comprises:

selecting one or more of the related queries to be selected related queries, the selected related queries being selected based on the optimized value; and causing the search results and the selected related queries to be displayed on the display screen.

19. The method of claim 1, the redundancy between the related queries being based on similarities between query text of the related queries.

20. The computer-readable storage device of claim 13, the redundancy between the related queries being based on similarities between snippets of the differing search results returned responsive to the related queries.

* * * * *